(12) United States Patent
Zapinski

(10) Patent No.: US 6,799,795 B1
(45) Date of Patent: Oct. 5, 2004

(54) SUN VISOR ARM WITH NOTCHED BREAK POINTS

(75) Inventor: Mike J. Zapinski, Macomb Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/605,976

(22) Filed: Nov. 11, 2003

(51) Int. Cl.$^7$ .............................................. B60R 21/02
(52) U.S. Cl. .................................. 296/187.05; 280/748
(58) Field of Search ...................... 296/187.05, 97.1, 296/97.4, 97.7, 97.9, 97.12, 97.13; 280/748

(56) References Cited

U.S. PATENT DOCUMENTS

| | | | | |
|---|---|---|---|---|
| 4,178,035 A | | 12/1979 | Cziptschirsch | ............ 296/97 K |
| 4,394,043 A | * | 7/1983 | Moulding et al. | ......... 296/97.9 |
| 4,598,943 A | | 7/1986 | Scholz et al. | ............. 296/97 H |
| 5,004,289 A | * | 4/1991 | Lanser et al. | ............. 296/97.12 |
| 5,338,083 A | * | 8/1994 | Gute | ......................... 296/97.9 |
| 5,383,700 A | * | 1/1995 | Agro et al. | ................. 296/97.9 |
| 5,653,496 A | | 8/1997 | Mori et al. | .................. 296/189 |
| 5,984,398 A | | 11/1999 | Crotty, III | .................. 296/97.1 |
| 6,059,348 A | * | 5/2000 | Viertel et al. | .............. 296/97.9 |
| 6,494,521 B2 | | 12/2002 | Hennessey | ................. 296/97.9 |
| 6,547,308 B2 | * | 4/2003 | Hamelink et al. | ......... 296/97.9 |
| 2001/0005088 A1 | | 6/2001 | Hennessey | ................. 296/97.1 |
| 2001/0024048 A1 | | 9/2001 | Hobson et al. | ............ 296/97.1 |

FOREIGN PATENT DOCUMENTS

| | | | | |
|---|---|---|---|---|
| DE | 003133688 | * | 3/1983 | ................ 296/97.1 |
| EP | 000284566 | * | 9/1988 | ................ 280/748 |
| EP | 000398400 | * | 11/1990 | ............. 296/97.12 |
| FR | 002590208 | * | 5/1987 | ............. 296/97.13 |
| JP | 362110523 | * | 5/1987 | ............... 296/97.9 |

* cited by examiner

*Primary Examiner*—D. Glenn Dayoan
*Assistant Examiner*—H. Gutman
(74) *Attorney, Agent, or Firm*—Bill C. Panagos

(57) ABSTRACT

The present invention provides for the absorbing of energy during an impact with the front edge of the sun visor and directing the sun visor out of the impact area such that the sun visor front edge does not break under impact by the use of a sun visor arm that incorporates energy absorbing and directional collapsing through the use of breakaway notches in the sun visor arm.

20 Claims, 3 Drawing Sheets

SUN VISOR ARM WITH NOTCHED BREAK POINTS

BACKGROUND OF INVENTION

1. Field of the Invention

The present invention generally relates to automotive sun visors which are rotatively and pivotally mounted above the windshield. More particularly, the present invention relates to pivot rods upon which sun visors are pivotally mounted, wherein the pivot rod has a connection interface which is rotatively connected to the roof of the vehicle. Still more particularly, the present invention relates to a head impact energy absorbing pivot rod having Notched break points.

2. Description of the Related Art

Motor vehicle standards are being continuously updated. One area of current concern is occupant safety in the event of a crash. Occupants are typically violently moved in relation to the vehicle due to the inertial forces involved in a crash. Most vulnerable is the head of the occupants. In order for vehicle manufacturers to meet new safety standards prevention of head injury by violent contact is required.

One area of the interior of the passenger compartment of a motor vehicle that is particularly dangerous in the event of a head impact is the sun visor and sun visor rod. An occupant whose head violently strikes the sun visor and/or sun visor pivot rod is likely to be injured because the energy of the impact will be delivered to a small surface area of the skull and/or the visor material may fracture exposing a rigid sharp edge to the occupant's head. Solutions to this type of head injury are therefore required.

For example, U.S. Pat. No. 4,178,035 issued Dec. 11, 1979 to Cziptschirsch teaches a plastic sun visor arm, pivot, and mount assembly to replace the traditional comparable metal parts and eliminate the need to use screws to mount the assembly to the vehicle.

U.S. Pat. No. 4,598,943 issued Jul. 8, 1986 to Scholz et al teaches a method of mounting a sun visor on swivel bearing mounted within a deformable tube which can absorb energy during a collision by deforming under the force of an occupant's head hitting the sun visor.

U.S. Pat. No. 5,653,496 issued Aug. 5, 1997 to Mori et al teaches a sun visor arm mounting bracket having a deformable weakened area which under impact to the sun visor allows the sun visor arm to pass through the mounting bracket thereby absorbing the energy of the impact.

U.S. Pat. No. 5,984,398 issued Nov. 16, 1999 to Crotty, III teaches a sun visor with a deformable front or leading edge which will deform and absorb the energy of a collision when an occupant's head hits the leading edge of the sun visor.

U.S. Pat. No. 6,494,521 issued Dec. 17, 2002 to Hennessey and U.S. Patent Application Publication Number 2001/ 0005088 published Jun. 28, 2001 to Hennessey teaches a cover member to cover the sun visor arm and elbow to prevent an occupant's head from hitting same during a collision.

U.S. Patent Application Publication Number 2001/ 0024048 published Sep. 27, 2001 to Hobson et al teaches the use of a non-expanding adhesive to adhere two halves of a clam shell type sun visor together.

DISCLOSURE OF THE INVENTION

The present invention provides advantages and alternatives over the prior art by providing a sun visor arm that provides for the absorbing of energy during an impact with the front edge of the sun visor and directing the sun visor out of the impact area such that the sun visor front edge does not break under impact.

According to a further aspect of the present invention, there is provided a sun visor arm that prevents injury to a vehicle occupant from striking the front edge of a sun visor during a crash.

According to yet another aspect of the present invention there is provided an economical and advantageous sun visor arm that allows for energy absorbing features to be introduced during the molding process of the sun visor arm.

The present invention thus advantageously provides an economical means of providing occupant protection from head injury from a sun visor during a crash.

DETAILED DESCRIPTION

Figure 1:
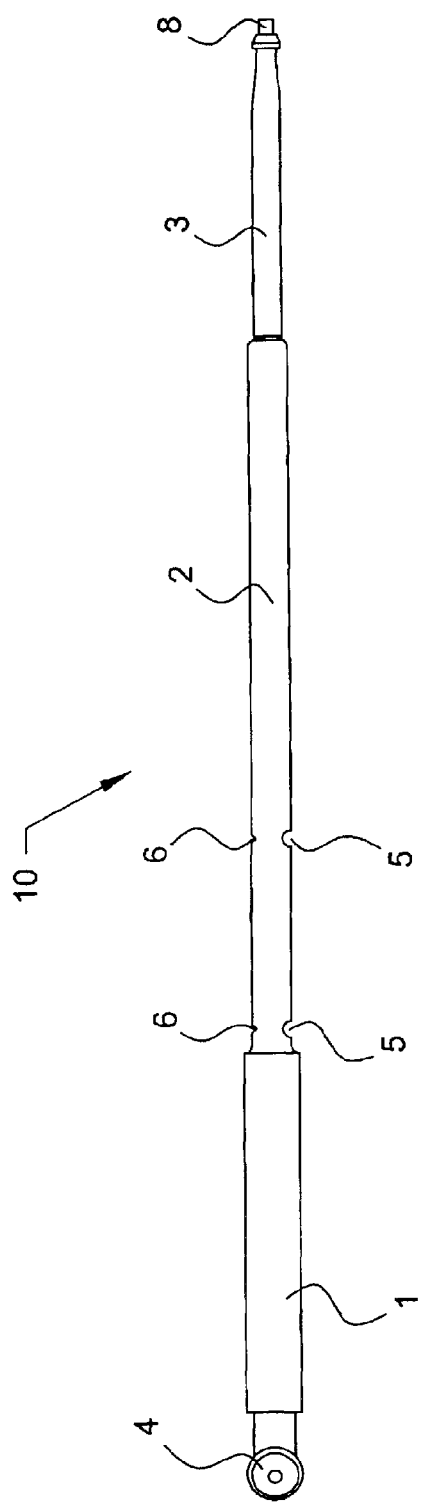
FIG. 1 shows a top plan view of one embodiment of the visor arm of the present invention.

Reference will now be made to the drawings, wherein to the extent possible like reference numerals are utilized to designate like components throughout the various views. Referring to FIG. 1, which presents a top view of one preferred embodiment of the present invention comprising a tubular visor arm 10 with a distal end section 1 having an elbow shape and further having a mounting flange 4 (FIG. 2) for mounting to a visor arm mounting bracket (not shown).

As further shown in FIG. 1 tubular visor arm 10 also comprises a mid section 2 and a proximal or tip section 3. The tubular end section 1, mid section 2, and tip section 3 all are molded as a single unit around a tubular metal shaft 8. Mid section 2 having at least one first breakaway notch 5 and at least one second breakaway notch 6 located substantially about 180 degrees from said at least one first breakaway notch 5 such that impact with the sun visor causes the tubular visor arm 10 to collapse and move toward the windshield or front of the vehicle and simultaneously downward. In a preferred embodiment shown in FIGS. 1 and 2 there are two first breakaway notches 5 and two second breakaway notches 6. Tip section 3 has at least one flat area 7 (FIG. 2) thereon providing a means of holding the sun visor in an up or storage position.

Figure 2:
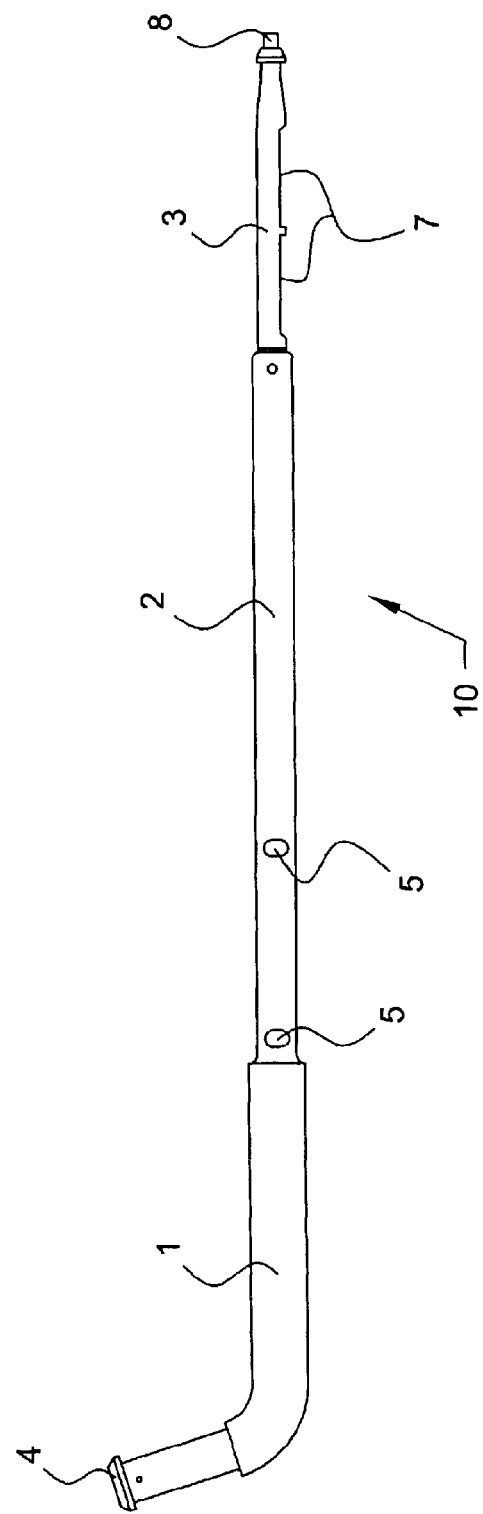
FIG. 2 shows a front plan view of the embodiment of the visor arm of the present invention shown in FIG. 1.

Referring now to FIG. 2, there is shown a front plan view of the tubular visor arm 10 of FIG. 1. This front view gives a better view of the mounting flange 4 located substantially at the distal end of tubular visor arm 10 as well as the elbow in the distal end section 1 as well as the at least one flat area 7 on the tip section 3. The notches 5 are also shown in this view which presents the side of the tubular visor arm 10 facing the occupant or rear of the vehicle when the sun visor (not shown) is in a down or use position. It is presently preferred for the angle of the elbow in the distal end section 1 to be substantially about 90 degrees.

Figure 3:
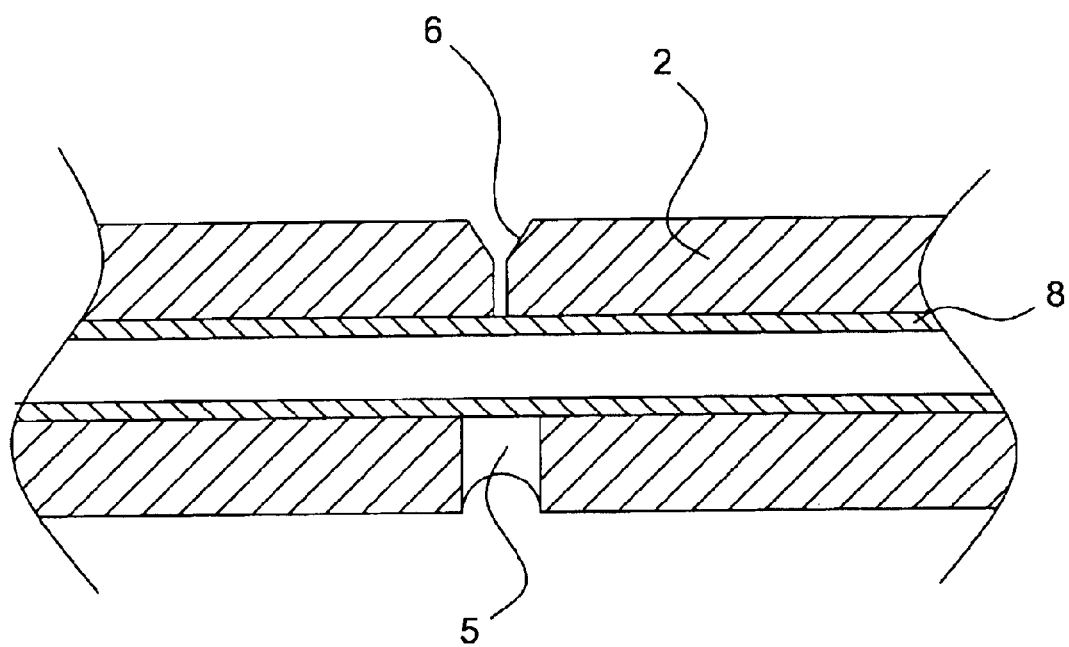
FIG. 3 shows a partial cross section plan view of the notches of a preferred embodiment of the visor arm of the present invention.
Figure 4:
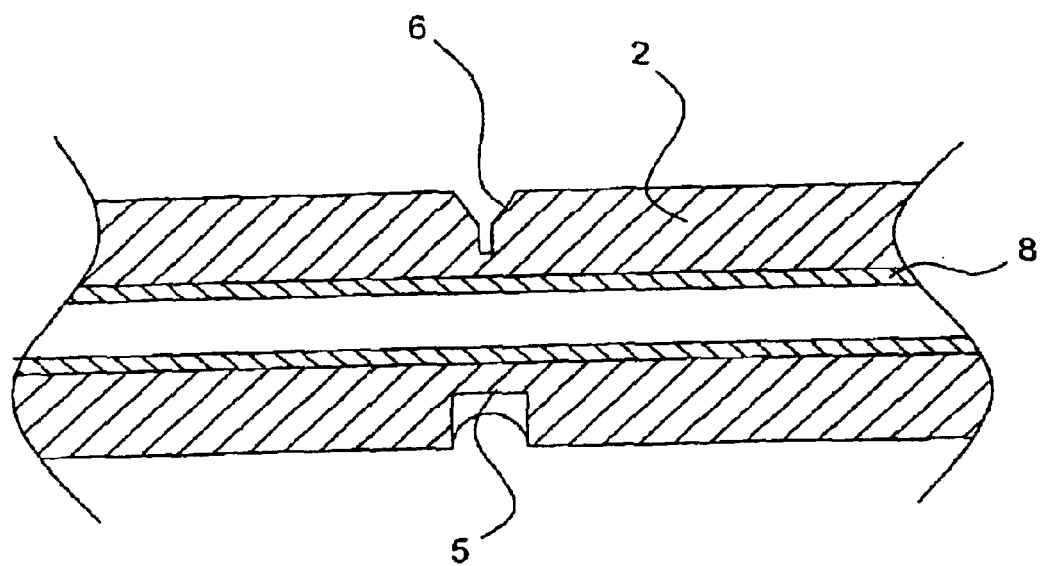
FIG. 4 shows a partial cross section plan view of the notches of another preferred embodiment of the visor arm of the present invention.

Turning now to FIG. 3, there is shown a partial cross section plan top view of mid section 2 of the tubular visor of shown in FIGS. 1 and 2. Tubular sun visor arm body 2 is shown with metal tube 8 and the notched configuration of first breakaway notch 5 and second breakaway point 6. It is to be noted that in the presently preferred embodiment the breakaway notches 5 and 6 penetrate through the tubular wall of mid section 2 but that either or both notches 5 and 6 can also be configured such that they do not penetrate the tubular wall of mid section 2. It is to be further noted that the presently preferred first breakaway notch 5 has an ovoid shape and the preferred second breakaway notch 6 has is v-shaped.

Suitable materials for the composition of the tubular sun visor arm 10 include, for example, plastic, acetal or nylon, the presently preferred material is nylon.

Suitable materials for the composition of the metal tubular core 8 include, for example, tubular steel, tubular aluminum and the like.

During a impact by the occupant's head with a sun visor assembly having the visor arm of the present invention the at least one breakaway notch 6 creates a predetermined weak point where the visor arm will break from the impact directing the sun visor to move forward and downward. The at least one breakaway notch 5 providing upon impact a broken section that is less likely to create an exposed cutting edge to the occupant's head.

Although the preferred embodiments of the present invention has been disclosed, various changes and modifications may be made without departing from the scope of the invention as set forth in the appended claims.

What is claimed is:

1. A visor arm structure of a sun visor assembly disposed in a passenger compartment, the visor arm absorbing energy during an impact to the edge of the sun visor assembly comprising:
   a molded tubular visor arm having a distal end portion, a middle portion, and a proximal end portion molded over a tubular metal shaft;
      said distal end portion having an elbow bend therein and further having an attachment flange for attaching said tubular visor arm to a visor arm mounting bracket;
      said middle portion having at least one first breakaway notch and at least one second breakaway notch positioned around the tubular visor arm middle portion substantially about 180 degrees from said first breakaway notch so as to direct the sun visor assembly in a predetermined direction to a predetermined collapsed position; and
      said proximal end portion having at least one flat surface area providing a sun visor storage position locating point;
   whereby upon impact to the front edge of a sun visor assembly the breakaway notches cause the visor arm structure to absorb energy and collapse the sun visor assembly to a predetermined collapsed position without producing a sharp broken edge to an occupant's head.

2. The visor arm structure as claimed in claim 1 wherein, said elbow bend in said distal end portion is substantially about 90 degrees.

3. The visor arm structure as claimed in claim 1 wherein, there is a plurality of the first and second breakaway notches in said middle portion of said tubular visor arm.

4. The visor arm structure as claimed in claim 1 wherein, said tubular metal shaft is selected from the group consisting of steel tubing, and aluminum tubing.

5. The visor ant structure as claimed in claim 1 wherein, said tubular visor arm comprises a material selected from the group consisting essentially of, plastic, acetal, and nylon.

6. The visor arm structure as claimed in claim 1 wherein, the predetermined direction to the predetermined collapsed position is forward and downward.

7. The visor arm structure as claimed in claim 1 wherein, there are two said flat surface areas providing a the sun visor storage position locating point on said proximal end portion.

8. The visor arm structure as claimed in claim 1 wherein, said at least one first breakaway notches are ovoid in shape and said at least one second breakaway notches are v-shaped.

9. The visor arm structure as claimed in claim 1 wherein, said at least one first breakaway notch and said at least one second breakaway notch extend completely through the wall of said molded tubular visor arm.

10. The visor arm structure as claimed in claim 1 wherein, said at least one first breakaway notch and said at least one second breakaway notch extend from the exterior surface only a portion of the distance through the wall of said molded tubular visor arm.

11. A visor arm structure of a sun visor assembly disposed in a passenger compartment, the visor arm absorbing energy during an impact to the edge of the sun visor assembly comprising:
   a molded tubular visor arm having a distal end portion, a middle portion, and a proximal end portion molded over a tubular metal shaft;
      said distal end portion having an elbow bend therein and further having an attachment flange for attaching said tubular visor arm to a visor an mounting bracket;
      said middle portion having two first breakaway notches and two second breakaway notches positioned around the tubular visor arm middle portion substantially about 180 degrees from said first breakaway notches so as to direct the sun visor assembly in a predetermined direction to a predetermined collapsed position; and
      said proximal end portion having at least one flat surface area providing a the sun visor storage position locating point;
   whereby upon impact to the front edge of the, sun visor assembly the breakaway notches cause the visor arm structure to absorb energy and collapse the sun visor assembly to a predetermined collapsed position without producing a sharp broken edge to an occupant's head.

12. The visor arm structure as claimed in claim 11 wherein, said elbow bend in said distal end portion is substantially about 90 degrees.

13. The visor arm structure as claimed in claim 11 wherein, said tubular metal shaft is selected from the group consisting of steel tubing, and aluminum tubing.

14. The visor arm structure as claimed in claim 11 wherein, said tubular visor arm comprises a material selected from the group consisting essentially of, plastic, acetal, and nylon.

15. The visor arm structure as claimed in claim 11 wherein, the predetermined direction to the predetermined collapsed position is forward and downward.

16. The visor arm structure as claimed in claim 11 wherein, there are two flat surface areas providing the sun visor storage position locating point on said proximal end portion.

17. The visor arm structure as claimed in claim 11 wherein, said two first breakaway notches are ovoid in shape and said two second breakaway notches are v-shaped.

18. The visor arm structure as claimed in claim 11 wherein, said two first breakaway notches and said two second breakaway notches extend completely through the wall of said molded tubular visor arm.

19. The visor arm structure as claimed in claim 11 wherein, said at least one first breakaway notch and said at least one second breakaway notch extend from the exterior surface only a portion of the distance through the wall of said molded tubular visor arm.

20. The visor arm structure as claimed in claim 11 wherein, said tubular metal shaft is a steel tubular metal shaft.

* * * * *